United States Patent Office 3,390,769
Patented July 2, 1968

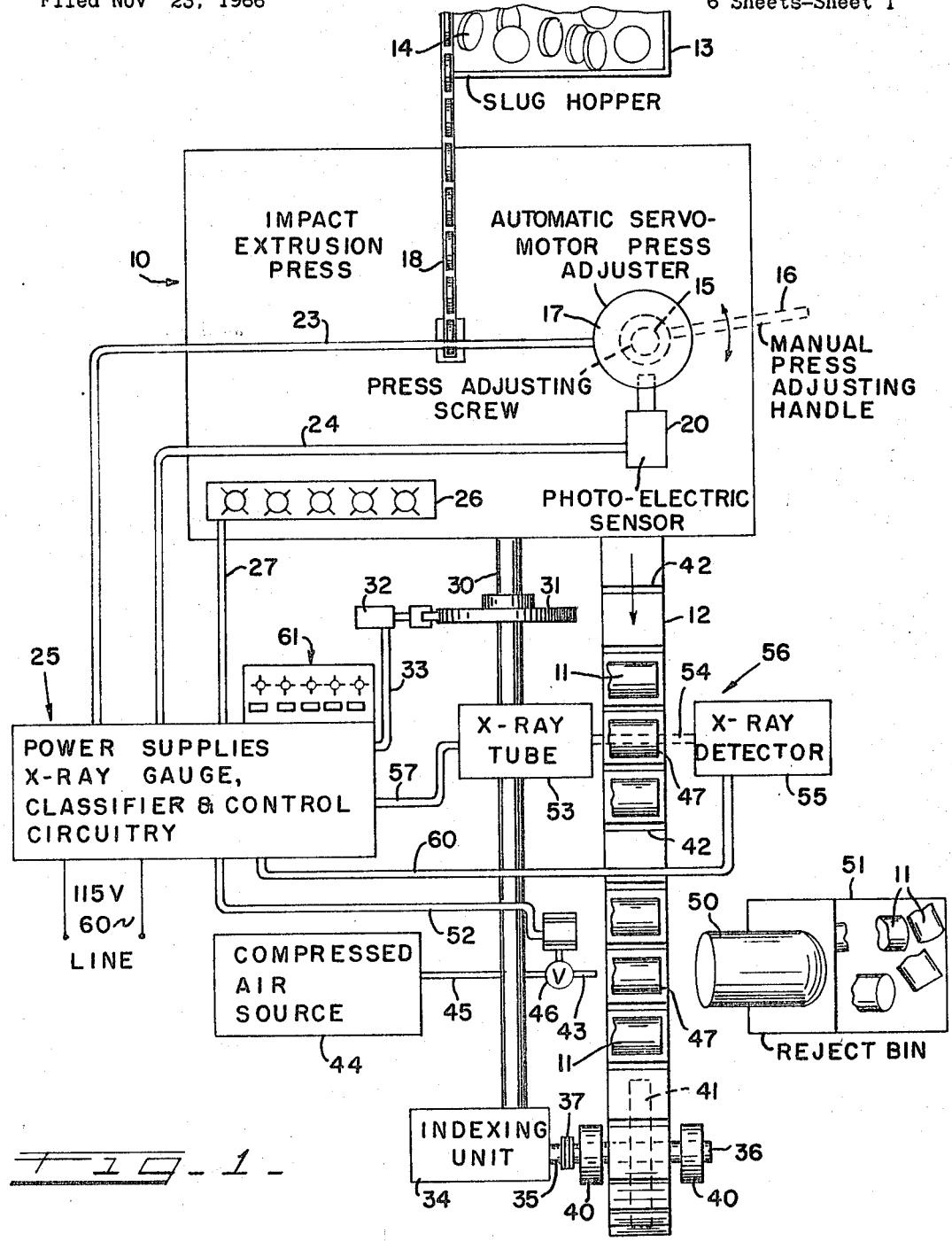

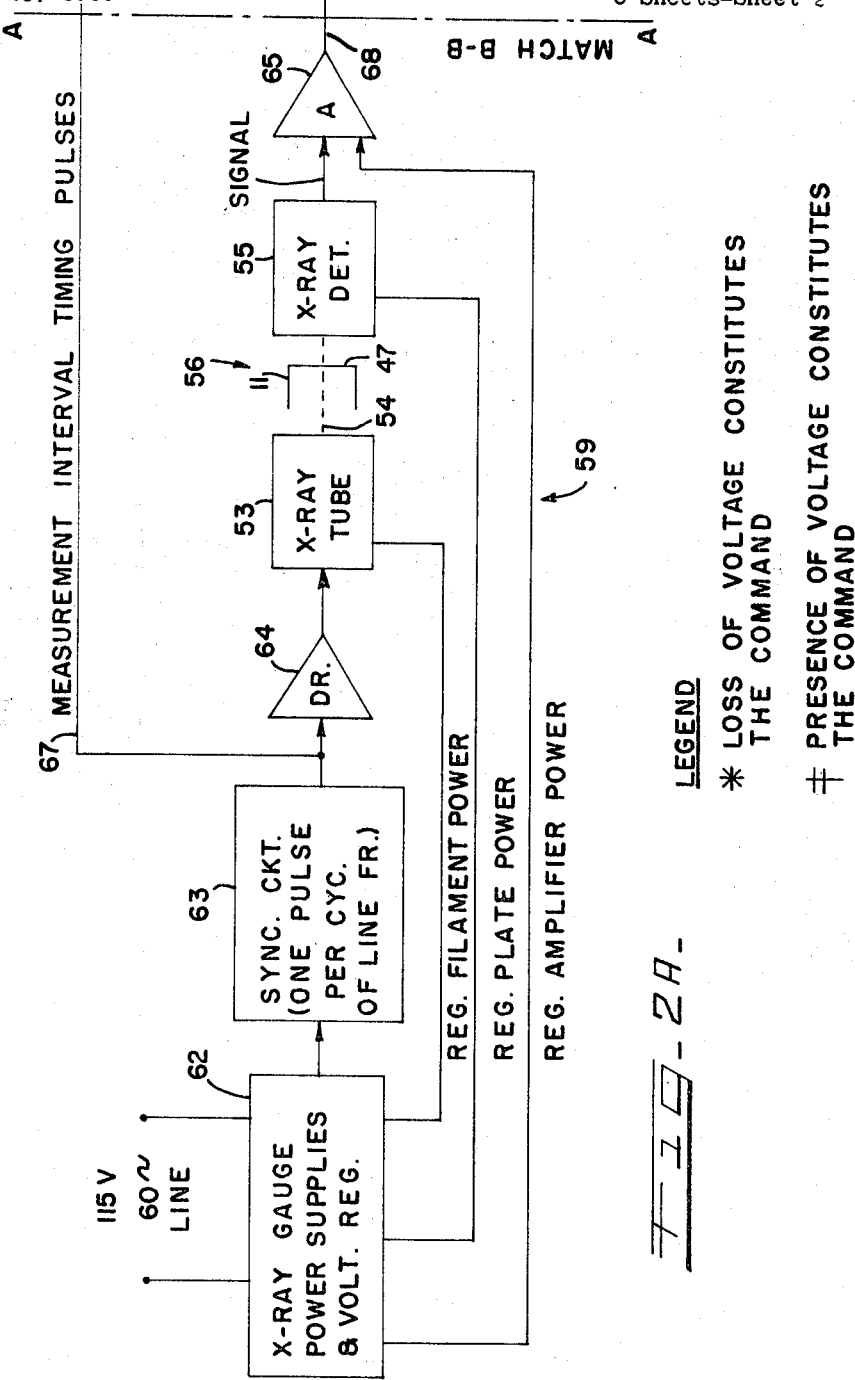

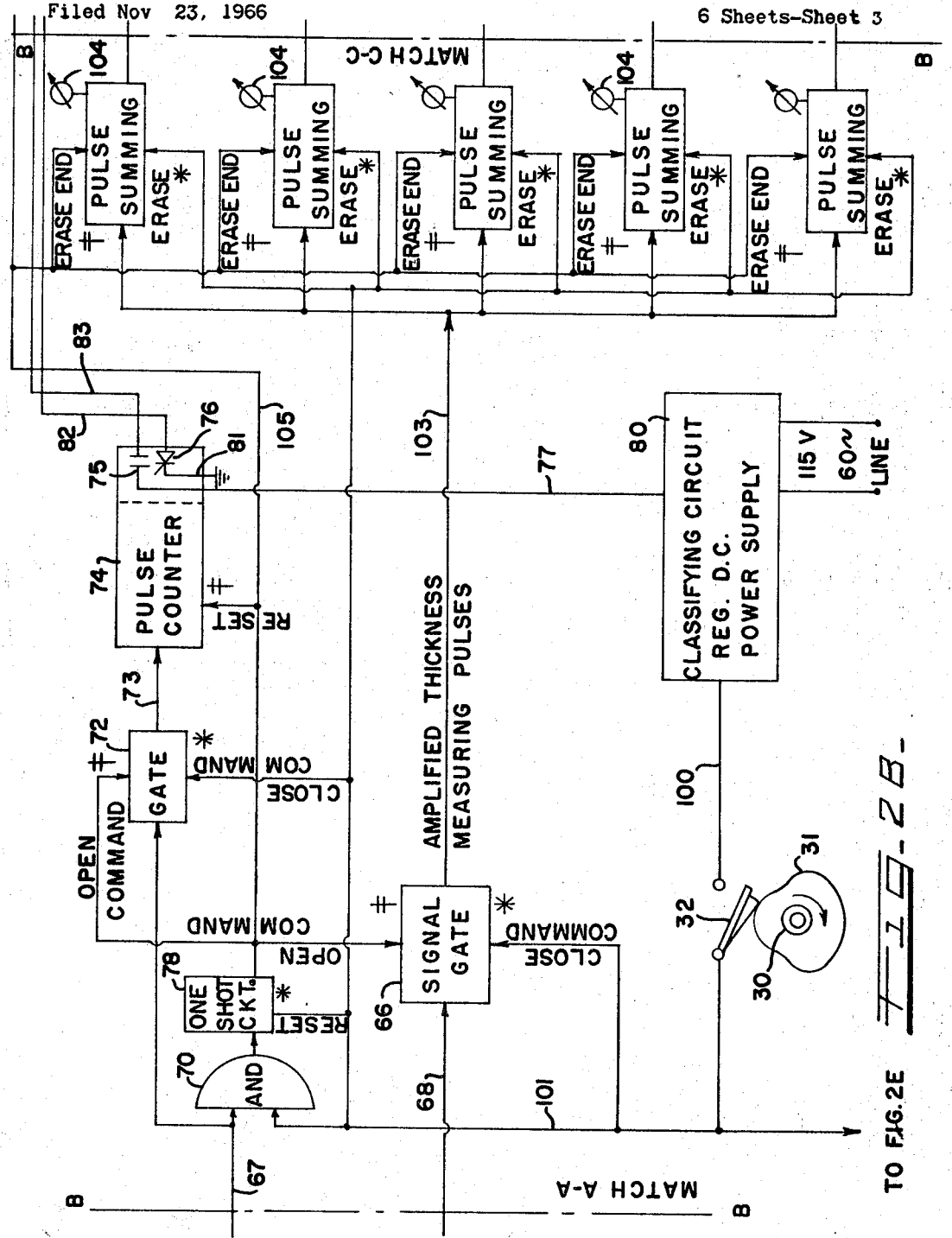

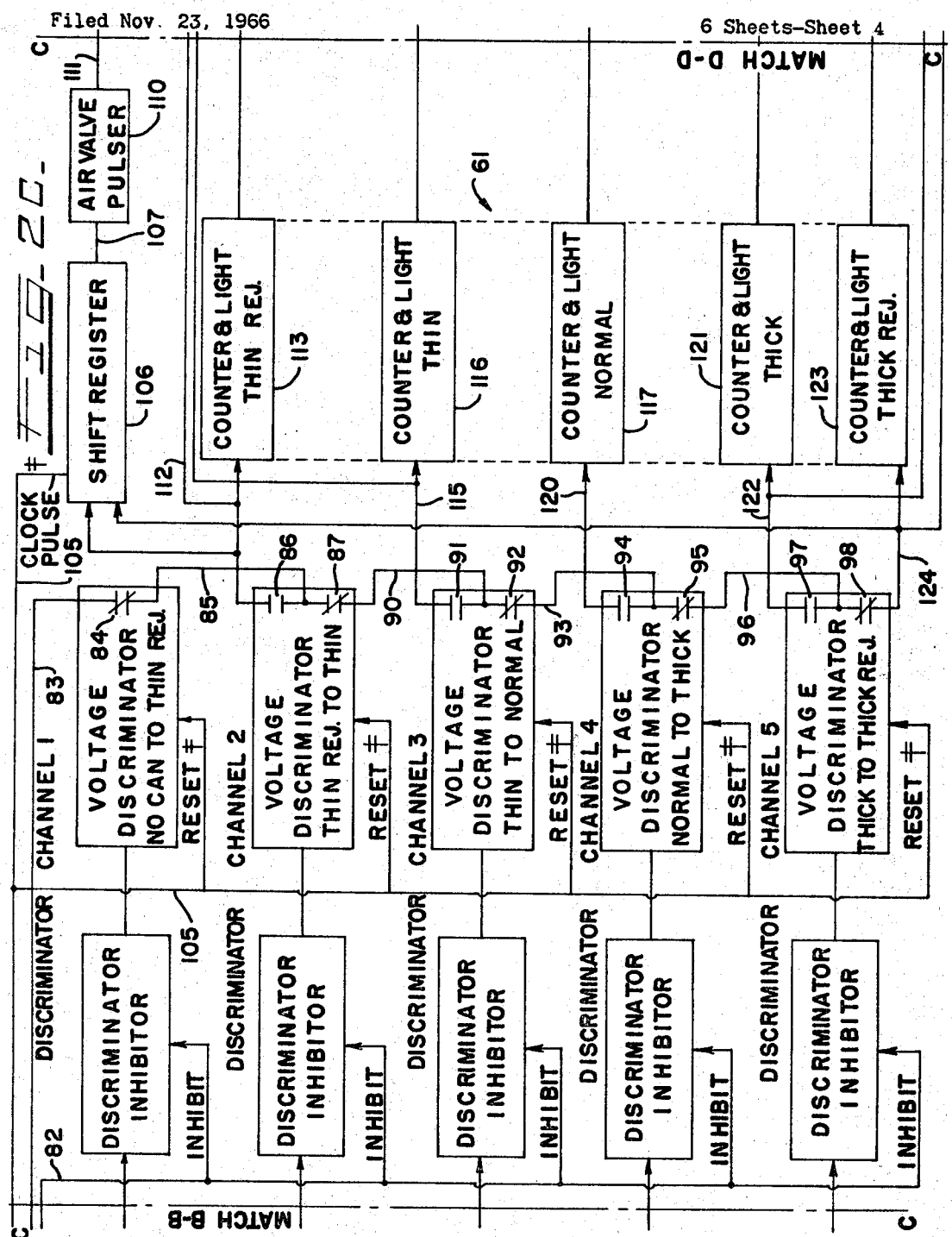

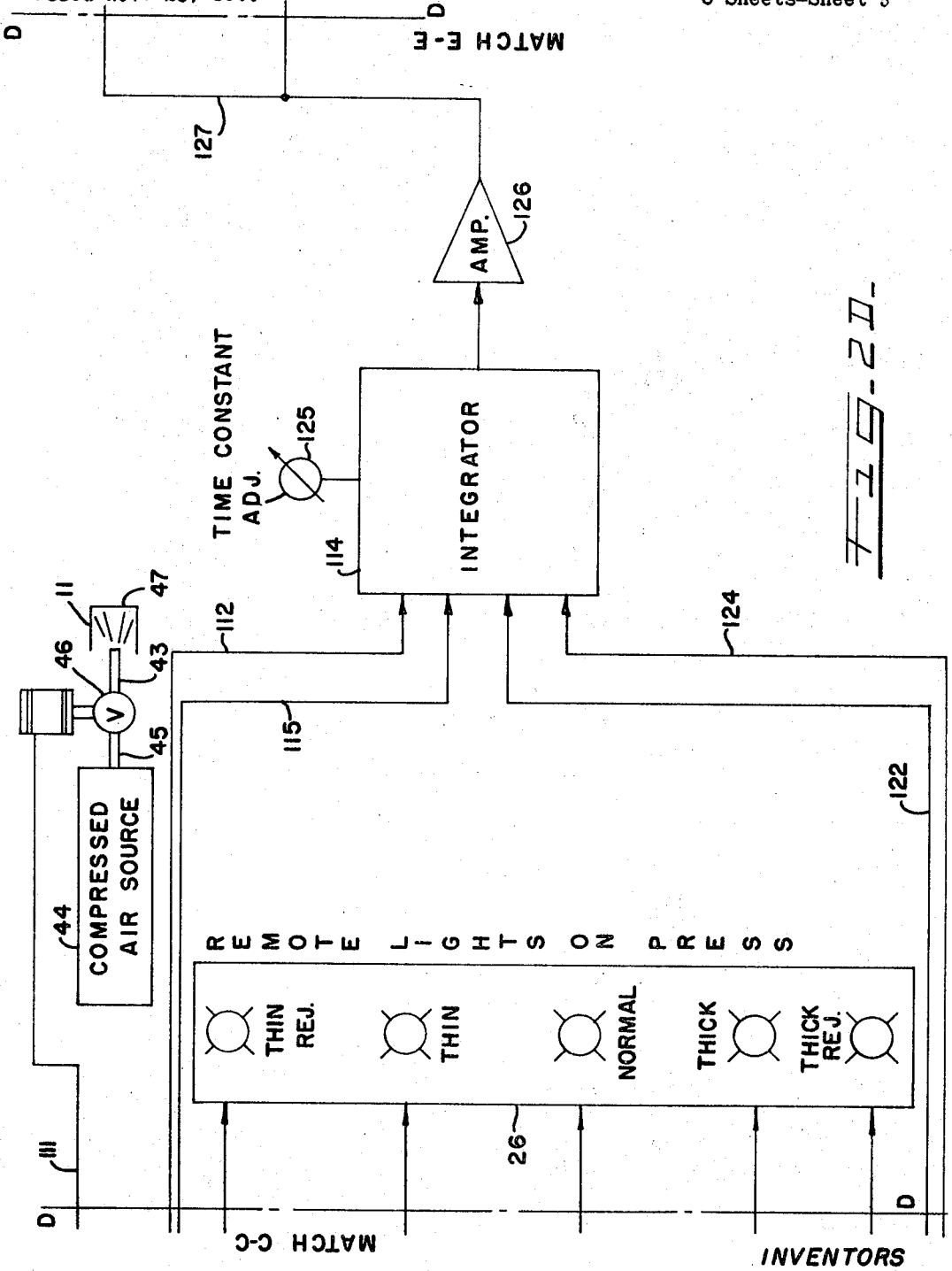

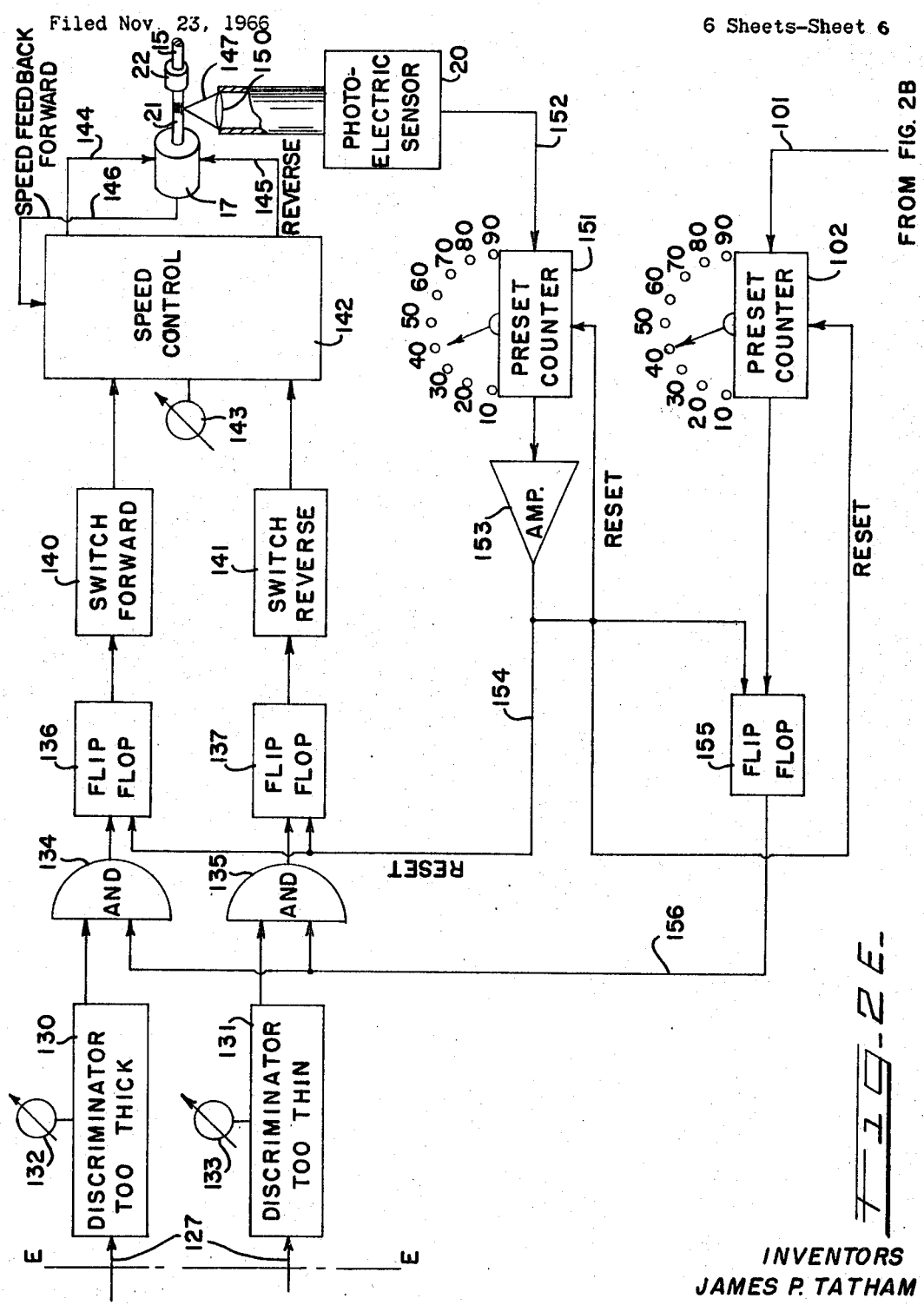

3,390,769
X-RAY THICKNESS GAUGING AND CLASSIFYING APPARATUS
James P. Tatham, Wheaton, and Ernest M. Gore, Chicago, Ill., assignors to Continental Can Company, New York, N.Y., a corporation of New York
Filed Nov. 23, 1966, Ser. No. 596,646
15 Claims. (Cl. 209—111.5)

The present invention relates to improvements in the art of radiation type thickness gauging. The invention particularly provides X-ray gauging apparatus that performs a thickness measurement on discrete articles as the articles are being conveyed on a conveyor system.

X-ray gauges have been used in industry for many years to measure the thickness of material interposed between an X-ray source and a detector, wherein the material is either hand fed or is a continuously moving web. X-ray gauging devices for performing such measuring operations are commercially available from a number of sources. However, in spite of a need for X-ray gauging apparatus capable of gauging and classifying discrete articles in a production line, and rejecting out of tolerance articles from the production line, no such apparatus was found to be commercially available from known manufacturers of X-ray gauging equipment.

In the manufacture of cans by the impact extrusion process it is desirable to measure the thickness of the bottom wall of the rough or semi-finished cans, as they leave the impact extrusion press on a flight conveyor, in order to immedaitely determine whether the bottom wall thickness is within a desired tolerance range so as to permit the adjusting of the extrusion press without delay in the event that it is found that the bottom wall of the rough cans being turned out by the extrusion press is not within the desired tolerance range. Since the semi-finished cans leave the impact extrusion press at a relatively high rate, such as, for example, as high as 240 per minute, it is impractical to gauge the thickness of the bottom of the cans by contacting the bottom of the cans with mechanical measuring tools. In order to perform this measurement satisfactorily at high production rates it was therefore necessary to resort to non-contact type thickness sensing means such as provided by a radiation type gauge. Since no manufacturer of radiation gauging equipment could be located who had equipment capable of performing the can bottom measuring operation at the entcountered production speed rates it was necessary to develop the present invention in order to accomplish the desired objective.

Accordingly, in the broad sense, the invention provides radiation gauging apparatus including thickness measuring and classifying means for measuring and classifying each of a series of discrete articles being conveyed in single file order on a conveying system. The provision of such apparatus is therefore the broad objective of the invention.

A more specific object of the invention is to additionally provide means associated with the gauging apparatus for removing articles determined to be out of tolerance from the conveyor system.

A still further object of the invention is to additionally include visual signalling means that visually indicates the thickness classification of each article measured: that is; whether it is of normal thickness; thicker than normal but within tolerance; thinner than normal but within tolerance; or too thin or thick to be acceptable.

A further and more specific object of the invention is to provide X-ray type radiation gauging apparatus associated with a manufacturing machine that produces discrete articles and delivers the articles produced on a take-away conveyor for further processing. The X-ray gauging apparatus including means to perform a thickness measuring and classifying operation on each of the produced articles as they pass by on the conveyor and provide visual indication to a machine operator to advise him whether the articles are within an acceptable tolerance range or are out of tolerance and unacceptable so that he is able to make running adjustments to the manufacturing machine to keep the articles being produced within the acceptable tolerance range and close to the optimum thickness.

A still further object of the invention is to provide X-ray gauging apparatus associated with a manufacturing machine as immediately above described in which means are also provided for removing articles from the take-away conveyor that are found to be out of the acceptable tolerance range.

A further object of the invention is to provide radiation type gauging and control apparatus associated with a production machine for producing discrete articles which are delivered therefrom on a take-away conveyor, including means to perform a thickness measuring operation on each of the articles passing along the take-away conveyor and means to automatically periodically adjust the production machine if a trend in the measurements indicates that a majority of the articles being produced are thicker or thinner than an optimum desired thickness.

Still further and more detailed objects and advantages of the invention will become apparent upon reading the following description of a preferred form of the invention illustrated in the accompanying drawings in which:

FIGURE 1 is a diagrammatic plan view of the X-ray gauging apparatus of the invention associated with an impact extrusion press which manufactures semi-finished cans and delivers the cans on a take-away conveyor for further processing; and, FIGURES 2A, 2B, 2C, 2D and 2E combine when arranged end to end in sequence and matched along the match lines thereon to illustrate the X-ray gauge circuitry; classifier circuitry and automatic press control circuitry.

With reference to FIGURE 1, the impact extrusion press, indicated generally by the numeral 10, manufactures semi-finished cans 11 and delivers the semi-finished cans therefrom on a flight conveyor 12 for further processing. A slug-hopper 13 is associated with the impact extrusion press 10 and contains a supply of slugs in the form of round discs of soft metal, such as, for example, aluminum, which are delivered in single file order to the press in a feed chute 18. The soft metal discs are indicated by the numeral 14. The impact extrusion press which is of conventional design includes a die block (not shown) having an extrusion die cavity in the form of a cup into which a disc is fed for the production of a semi-finished container. The press also includes a ram (not shown) which is driven into the extrusion die cavity with considerable force so that the end of the ram strikes the soft metal disc on one of its flat surfaces with sufficient impact to cause plastic flow of the soft disc metal along the side wall of the cavity resulting in the formation of a cup or semi-finished can from the metal disc or slug. A conventional press adjusting screw 15 is provided for axially positioning the die cavity containing block with respect to the direction of movement of the ram to adjust the clearance space between the end of the ram and the bottom of the die cavity. The press screw is normally adjusted by means of a manually operated turning handle 16 shown in phantom outline but may also be automatically adjusted in accordance with the invention, as will be hereinafter explained, by means of the servo motor 17. If the press adjusting screw is rotated in one direction it decreases the clearance between the die cavity bottom and the end of the ram with the result that the semi-finished containers being produced will have a thinner bottom wall. Reversing the direction of rotation of the adjusting screw 15 on the other hand results in the clearance being nicreased and the can bottoms being thicker. Other factors are also involved besides the setting of the die clearance in determining the thickness of the can bottom wall such as, for example, slug dimensional accuracy; slug hardness; slug surface finish; slug lubricant used; details of tooling geometry; tooling wear; press linkage play and resiliency. One or more of these factors may enter into the manufacturing operation as a variable which must be compensated for by repositioning the press adjusting screw 15 to change the die clearance as necessary in order to insure that the bottoms of the containers being manufactured will be close to the optimum desired value within the acceptable manufacturing thickness tolerance range.

A reflex type photoelectric sensor 20 is focused on the output shaft 21 of the servo motor 17 as best illustrated in FIGURE 2E. The photoelectric sensor 20 senses the amount of rotation of the output shaft 21 of the servo motor and also the press adjusting screw 15 which is directly coupled to the output shaft 21 by means of a coupling device 22. Referring back to FIGURE 1 it will be observed that the servo motor and photoelectric sensor have electrical conduits 23 and 24 respectively connected thereto which connect electrical conductors therein into the electrical circuitry contained in a console generally indicated at 25. Mounted remotely from the console 25 is a bank of indicating lights 26. The bank of lights 26 is preferably mounted either on or closely adjacent the press 10 where it can be observed by the person operating the press. The bank of indicating lights 26 is communicated with the console 25 by means of conductors within an electrical conduit 27.

A timing shaft 30, which is driven by the press 10, extends from the press in a horizontal direction. The shaft 30 rotates constantly and makes one revolution for each operation of the press which produces a semi-finished can. Mounted on the timing shaft 30 for rotation thereby is a timing cam 31 which operates an electrical timing switch 32 associated therewith. The timing switch 32 is connected into the console circuitry 35 by electrical conductors in an electrical conduit 33.

The end of the timing shaft 30 remote from the press 10 drives an indexing unit of conventional design indicated at 34. Indexing unit 34 has an output shaft 35 which is coupled to a conveyor drive shaft 36 by means of a flexible coupling 37. A pair 40 of upstanding bearing supports rotatably supports the shaft 36. Mounted on the shaft 36 for intermittent rotation thereby is a drive sprocket 41 for driving the flight conveyor 12. During each revolution of the input shaft 30 to the indexing unit 34 the output shaft 35 thereof rotates a part of a revolution and stops at an indexed position. This results in the movement of the semi-finished cans 11 positioned between the conveyor flights 42 being moved along the conveyor 12 a distance equal to the distance between adjacent flights 42 during each complete indexing movement of the output shaft 35 and consequently within each complete revolution of the timing shaft 30.

Positioned in axial alignment with a semi-finished can 11 when the can is at an indexed position on the conveyor 12 is a compressed air nozzle 43. Compressed air is supplied to the nozzle 43 from a compressed air source 44 through a pipe 45 and a solenoid operated air flow control valve 46. When the valve 46 is opened, a jet of air from the nozzle 43 strikes the bottom wall 47 of the semi-finished can 11 to blast the can from the conveyor 12 into chute 50 of a reject bin 51. An electrical conduit 52 communicates conductors from the valve 46 to the circuitry in the console 25.

An X-ray tube 53 is positioned adjacent the conveyor 12 so as to direct a beam of X-ray pulses indicated at 54 in an axial direction toward a semi-finished can in an indexed position. The X-ray pulses pass through the bottom wall of the can and are picked up by an X-ray detector 55 which is positioned in axial alignment with the X-ray tube 55 and the can under test. The X-ray tube 53 and X-ray detector 55 comprise the principal elements of a thickness measuring station generally designated 56. Electrical conduits 57 and 60 contain conductors from the X-ray tube and X-ray detector respectively and connect the conductors into the circuitry in the console 25.

The console 25 is provided with a bank of can bottom wall thickness classification indicating lights and counters indicated at 61. The prime source of electrical power for operating the circuitry in the console 25, may be, as illustrated, ordinary 115 volt 60 cycle house current.

Referring to FIGURES 2A through 2E, and to FIGURE 2A in particular, the circuitry of the invention will be described. The X-ray gauging apparatus indicated generally by the numeral 59 and illustrated in its entirety in FIGURE 2A is of a standard commercially available type with certain modifications in accordance with the invention as will be explained. This apparatus comprises power supply and voltage regulating circuitry indicated by the numeral 62 energized from ordinary 115 volt 60 cycle house lines. A synchronizing circuit 63 receives voltage regulated current at line frequency from the power supply and voltage regulating circuitry 62 and generates one discrete pulse per cycle of line frequency. The discrete pulses are delivered via the driver 64 to the X-ray tube plate. The pulses are converted into X-ray energy also in the form of discrete pulses, which are shown at 54 passing through the bottom wall 47 of a can 11 and being picked up by the X-ray detector 55. The X-ray detector consists of a crystal placed in front of a photo-multiplier tube. The crystal converts the photon energy of the X-ray pulses into energy in the frequency range of visible light and the photo-multiplier tube then converts the light pulses into discrete electrical pulses. The signal pulses from the X-ray detector are amplified by the amplifier 65 and the amplified signal pulses, which are thickness measuring pulses, are delivered to the signal gate 66 of FIGURE 2B, via a conductor 68.

The X-ray tube 53; X-ray detector 55 and the amplifier 65 are respectively provided with regulated filament power; regulated plate power and regulated amplifier power from the power supply and voltage regulating circuitry 62. A conductor 67 interposed between the synchronizing circuit 63 and the driver 64 delivers measurement interval timing pulses from the synchronizing circuit 63 to an "AND" circuit 70. The output of the "AND" circuit 70 is delivered to a "one shot" circuit 78.

As stated before, the X-ray gauging apparatus 59 of FIGURE 2A is of a type that is completely conventional and commercially available with two exceptions. The first exception is that the provision of the conductor 67 for supplying measurement interval timing pulses to the "AND" circuit 70 is a modification in accordance with the invention. In accordance with usual present day practice after the amplified signal pulses leave the amplifier 65 they pass into an integrator wherein they are smeared together and converted into a direct current output, the level of which is indicative of the thickness of a web or object placed between the X-ray tube and X-ray detector. The second exception in accordance with the invention is the elimination of this stage of integration from the standard type of X-ray gauging apparatus 59 so that the signal delivered to the gate 66 is still in the form of discrete voltage pulses.

With the exception of the X-ray tube 53 and the X-ray detector 55, the remainder of the X-ray gauging apparatus circuitry depicted in FIGURE 2A is housed in the console 25.

Referring to FIGURE 2B it will be seen that a branch of the conductor 67 delivers the measurement interval timing pulses which are of substantially constant size and height to a gate 72. Measurement interval timing pulses that pass through the gate 72 are delivered on a conductor 73 to a pulse counter 74. The pulse counter 74 has operatively associated therewith for operation thereby a set of normally open relay contacts 75 and a silicon controlled rectifier 76. The relay contacts 75 are connected by a conductor 77 to a regulated D.C. power supply 80 which is energized from 115 volt 60 cycle house current. The silicon controlled rectifier 76 is grounded by means of a ground conductor 81. The silicon controlled rectifier also connects, by means of a conductor network 82, to the five discriminator inhibitor circuits of discriminator channels 1-5 of FIGURE 2C. Similarly, a conductor 83 connects the contacts 75 with a set of normally closed relay contacts 84 operatively associated with a voltage discriminator circuit of discriminator channel 1. A conductor 85 connects to the contacts 84 for delivering electrical energy therethrough to a set of normally open relay contacts 86 and a set of normally closed relay contacts 87 associated with a voltage discriminator circuit of discriminator channel 2. A conductor 90 connects to the contacts 87 so as to supply electrical energy therethrough to a set of normally open relay contacts 91 and a set of normally closed relay contacts 92 operatively associated with a voltage discriminator circuit of discriminator channel 3. A conductor 93 in turn connects the contacts 92 between normally open contacts 94 and normally closed contacts 95 associated with a voltage discriminator circuit of discriminator channel 4. Contacts 95 in turn are connected by means of a conductor 96 so as to deliver electrical energy to a set of normally open contacts 97 and normally closed contacts 98 associated with a voltage discriminator circuit of discriminator channel 5.

A conductor 100 connects the timing switch 32 (FIGURE 2B) to the power supply 80. The opposite side of the switch 32 is connected to a conductor network 101 that has branches leading to the "AND" circuit 70; the signal gate 66; the "one shot" 78; the gate 72 and the pulse summing circuits of discriminator channels 1 through 5. Conductor network 101 also has a branch that connects with a preset counter 102 of FIGURE 2E.

A conductor network 103 delivers the thickness measuring pulses from the gate 66 to each of the pulse summing circuits of the discriminator channels 1 through 5. Each of the pulse summing circuits has an adjusting potentiometer associated therewith indicated by the numeral 104. A conductor network 105 connects the "one shot" circuit 78 with the gates 66 and 72; the pulse counter 74; the pulse summing circuits and voltage discriminator circuits of discriminator channels 1 through 5 and also to a shift register 106. The output from the shift register is delivered to an air valve pulser 110 via a conductor 107. The output of the pulser 110 is delivered on a conductor 111 to the operating solenoid of the air valve 46.

A conductor network 112 connects the set of contacts 86 with a "thin reject" counter and light unit indicated at 113, of the counter and light bank 61. The conductor network 112 also connects to the shift register 106 and to an integrator 114. A conductor network 115 connects the set of contacts 91 with a counter and light unit designated "thin" and indicated by the numeral 116. The conductor network 115 also connects to the integrator 114. A third counter and light and unit of the bank 61 designated "normal" is indicated by the numeral 117 and is connected with the contacts 94 via a conductor 120. The fourth counter and light unit designated "thick" is indicated at 121 and is communicated with the contacts 97 by means of a conductor network 122. The conductor network 122 also communicates with the integrator 114. The lowermost counter and light unit 123 in the bank 61 which is designated "thick reject" is communicated with the contacts 98 via a conductor network 124. The conductor network 124 also communicates with the shift register 106 and with the integrator 114. The integrator 114 is provided with a time constant adjustment 125. The output of the integrator 114 is delivered to an amplifier 126, and, after being amplified, is impressed on voltage discriminators 130 and 131 designated "too thick" and "too thin" via a conductor network 127. The voltage discriminators 130 and 131 are provided with adjusting potentiometers 132 and 133 respectively. The outputs of the voltage discriminators 130 and 131 are respectively impressed upon "AND" circuits 134 and 135. The outputs of the "AND" circuits 134 and 135 in turn are delivered respectively to flip-flop circuits 136 and 137. The flip-flop 136 delivers its signal to a switch designated "forward" and the flip-flop 137 delivers its signal to a switch designated "reverse," the respective switches being indicated by the numerals 140 and 141. The switch outputs are delivered to a speed control unit 142 having a speed adjustment thereon 143. The speed control unit communicates with the servo motor 17 via conductors 144 and 145 respectively designated "forward" and "reverse." "Feedback" conductor 146 delivers speed information from the servo motor back to the speed control unit. The speed control unit 142 is effective to maintain the output shaft 21 of the servo motor 17 at a substantially uniform rotational speed regardless of variations in load torque applied thereto. The output shaft 21 turns much slower than the armature shaft of the servo motor 17 since the servo motor 17 is of the geared-head type. The photoelectric sensor 20 which is of the reflex type, focuses light rays 147, by means of a lens 150, onto the surface of the output shaft 21 of the servo motor 17. The shaft surface is provided with evenly spaced apart marks therearound which cause changes in the intensity of the light reflected back from the surface of the shaft 21 through the lens 150 to a photosensitive cell in the photoelectric sensor 20 as the shaft rotates. Thus, as the shaft 21 rotates, the passage of each of the marks on the shaft 21 past the lens 150 causes a signal to be generated by the photoelectric sensor 20 and transmitted to a preset counter 151 via a conductor 152. The marks on the shaft 21 may be placed very close, such as, for example, one degree apart, with the result that each degree of rotation of the shaft 21 will be sensed by the photoelectric sensor 20. An amplifier 153 receives the output of the preset counter 151 and amplifies and delivers the output to a conductor network 154. The flip-flops 136 and 137 and a flip-flop 155 are communicated with the amplifier 153 via the conductor network 154. The preset counters 102 and 151 are also communicated with the conductor network 154 for the purpose of "resetting." The flip-flop 155 receives signals from the preset counter 102 and delivers the signals via a conductor 156 to the "AND" circuits 134 and 135.

With the physical description of the invention and the interrelationship of the various components thereof now having been completed, the operation will best be understood by the following description thereof:

OPERATION

Referring to FIGURE 1, the first step in manufacturing start-up is to set the impact extrusion press 10 in motion which results in the timing shaft 30 rotating at the rate of one revolution per cycle of the press. The timing shaft 30 operating through the indexing unit 34 results in intermittent motion being imparted to the flight conveyor 12 so as to carry semi-finished cans from the press. The electrical circuitry in the console 25 is energized and the slug-hopper 13 which is of the power driven type, is started so as to deliver slugs 14 through the feed chute 18 into the press 10. The slugs are delivered one at a time into the press die cavity and the press ram impact extrudes the slugs into the form of semi-finished or rough cams 11 which are delivered between the flights 42 of the flight conveyor 12. During each rotation of the timing shaft 30, the flight conveyor 12 will advance a distance equal to the distance between the flights 42 and will remain in a fixed position while the shaft 30 completes its rotation. When the first can produced by the press 10 arrives at the thickness measuring station 56 at which it is positioned between and in axial alignment with the X-ray tube 53 and the X-ray detector 55, the motion of the conveyor 12 is arrested so that the can remains in that position for a predetermined period of time within the time it takes for the timing shaft 30 to make one full revolution. X-ray pulses from the X-ray tube 53 penetrate the bottom wall 47 of the first can under test and the pulses then pass into the X-ray detector 55 for signal processing. It is to be understood that the X-ray beam 54 is on constantly while the apparatus of the invention is in operation and is not turned off when the conveyor 12 moves to index the next can into position at the thickness measuring station 56. Shortly after the first can is in the indexed position at the thickness measuring station 56, the switch 32 is closed by the cam 31. The closing of the switch 32 is effective to send a voltage signal from the conductor 100 through the switch 32 and conductor 101 to the "AND" circuit 70 of FIGURE 2B. Before the closing of the switch 32, measurement interval timing pulses of substantially constant amplitude and size were being delivered from the synchronizing circuit 63 via the conductor 67 to the "AND" circuit 70 but were prevented from conditioning the "AND" to deliver the pulses to the "one shot" 78, due to the absence of the necessary simultaneous signal to the "AND" 70 through the open switch 32. Similarly, before the closing of the switch 32, amplified thickness measuring pulses from the amplifier 65 were constantly delivered to the signal gate 66 at the same 60 cycle frequency as the measurement interval timing pulses. At this time, however, the signal gate 66 is closed and the amplified thickness measuring pulses are not passed through the gate onto the conductor network 103. The initiation of the measurement cycle is started by the arrival of the first measurement interval timing pulse on the conductor 67 at the "AND" circuit 70, after the closing of the switch 32. The closing of the switch 32 and the arrival of the first pulse thereafter on the conductor 67 at the "AND" circuit 70 provide the two necessary signals that when appearing simultaneously at the "AND" circuit condition the "AND" circuit to deliver pulses to the "one shot" 78; the first pulse delivered to the "one shot" causing it to fire and deliver a single signal pulse onto the conductor network 105. The appearance of the signal pulse on conductor network 105 from the "one shot" 78 performs five functions:

Firstly, it opens the signal gate 66 to allow the amplified thickness measuring pulses to appear on the conductor network 103; this action being slow enough so that no portion of the first thickness measuring pulse gets through the gate;

Secondly, it opens the gate 72 which permits the delivery of the subsequent pulses following the first pulse on the conductor 67 to be delivered through the gate 72 to the pulse counter on the conductor 73;

Thirdly, it acts as an "erase end" signal for each of the pulse summing circuits of discriminator channels 1 through 5 to render them receptive to sum incoming thickness measuring pulses on conductor network 103;

Fourthly, it acts as a reset signal for each of the voltage discriminator circuits and associated relay contacts of discriminator channels 1–5; and Fifthly, it acts as a clock pulse to the shift register 106 resulting in any signal in the shift register being shifted or advanced to the next station thereof.

Since the amplified thickness measuring pulses appearing on the conductor network 103 will be substantially in phase with the measurement interval timing pulses being delivered to the pulse counter 74 through the gate 72, the thickness measuring pulses will be substantially simultaneously added on the five pulse summing circuits while the measurement interval timing pulses are being counted by the pulse counter 74. In an operational embodiment, the peak of the thickness measuring pulses actually occurred about 100 microseconds after the peak of the measurement interval timing pulses. The pulse counter 74 is effective to count a definite number of pulses delivered thereto, and, upon counting of the last pulse, causes the turning on of the silicon-controlled rectifier 76 and the closing of the contacts 75 of the relay operatively associated therewith. The switching action of relay contacts 75 and connecting of conductor 82 to the ground conductor 81 in the pulse counter are slowed down in a conventional manner in order to assure that all of the last thickness measuring pulse is able to enter the pulse summing circuits before the voltage discriminators are inhibited.

It is desirable to have the pulse counter count as many pulses as possible within the time available before it closes the contacts 75 and turns on the silicon controlled rectifier 76. In the apparatus being described, which may manufacture semi-finished cans at a rate of 240 per minute it was found that eight pulses occurring at the line frequency of 60 pulses per second could be conveniently counted. Should the equipment be run at lower speeds making more time available in which to count the measurement interval timing pulses it would be better from the standpoint of measurement accuracy to count off perhaps 12 or 15 pulses before closing the contacts 75 and turning on the silicon controlled rectifier 76. The reason for this is that the amplified thickness measuring pulses may vary slightly in amplitude; therefore, by counting a large number of such pulses, any such slight variations between the pulses will tend to average out to a greater extent, making the pulse summations on the pulse summing circuits more precisely indicative of the actual thickness of the can bottom wall 47.

Each of the pulses summing circuits comprises a condenser (not shown) on which the thickness measuring pulses are sequentially impressed to build up a charge thereon in steps; one step for each of the eight pulses applied thereto. The total voltage or charge applied to the pulse summing circuits by the eight pulses will be approximately inversely proportional to the thickness of the bottom wall 47 of the can 11 at the thickness measuring station 56. The thicker the wall 47 the smaller will be the X-ray pulses that manage to penetrate through and when these pulses are summed up the resulting charge on the pulse summing circuits will be of a relatively low value. However, when the can 11 has a very thin bottom wall it is relatively easily penetrated by the X-rays, and the resulting thickness measuring pulses will be relatively large in size. When eight such pulses are summed on the summing circuits in step by step fashion the resulting charge on the condenser of the summing circuits will be relatively high. The eight pulses impressed on the summing circuits are added equally thereon; however, each of the condensers associated with the summing circuits has a different initial charge thereon, with the result that after the application of the eight thickness measuring pulses to the summing circuits, each of the summing circuits will have a different total charge thereon. The intial charge on the condenser of each summing circuit is adjusted by means of the potentiometer 104 associated with each of the summing circuits. The pulse summing circuit associated with discriminator channel 1 will initially be set so as to have the lowest initial charge on its condenser, of the five pulse summing circuits; the charges on the remaining pulse summing circuits being progressively higher such that the charge on the pulse summing circuit associated with discriminator channel 5 is the highest initial charge. The total charges on the pulse summing circuits as a result of the application of the eight measuring pulses thereto and including the initial charges as set by the potentiometer 104 are delivered through discriminator inhibitor circuits to respective voltage discriminator circuits of discriminator channels 1 through 5. Each of the voltage discriminator circuits 1 through 5 is adjusted so as to be triggered at the same voltage level. It will thus be apparent that since the initial charge level on the pulse summing circuits is the greatest on the pulse summing circuit of discriminator channel 5 that as the thickness measuring pulses are summed and delivered to the voltage discriminator circuits, the voltage discriminator circuit of discriminator channel 5 will always be the first of the voltage discriminator circuits to be triggered. The discriminator circuit of discriminator channel 4 will be the next to trigger; and the voltage discriminator of discriminator channel 3 followed by the voltage discriminators of channels 2 and 1 will trigger in order.

Assuming that the can under test has a very thick bottom that will be classified "thick reject," which the X-rays penetrate only with difficulty, the resulting thickness measuring pulses will be small in size. Such small pulse when added on the summing circuits will not provide a sufficiently high charge superposed on the initial charge of the condenser associated with the summing circuit of discriminator channel 5; which initial charge is the greatest initial charge on any of the pulse summing circuits; to trigger the voltage discriminator circuit of discriminator channel 5. The contacts 97 and 98 operatively associated with the voltage discriminator of channel 5 will therefore remain in their respective normally open and normally closed states. All of the remaining contacts associated with the voltage discriminator circuits associated with discriminator channels 1 through 4 will likewise remain in their normal states.

Upon counting the eighth pulse the pulse counter 74 acts to close the normally open relay contacts 75 associated therewith and simultaneously to turn on the silicon controlled rectifier 76 also associated therewith. The turning on of the silicon controlled rectifier 76 grounds the conductor network 82 through the grounded conductor 81. The grounding of the conductor network 82 functions as an "inhibit" signal to each of the discriminator inhibitor circuits of discriminator channels 1 through 5. When the discriminator inhibitors are so inhibited they will not pass on to the associated voltage discriminator circuits the resulting total voltage caused by the addition of the next following thickness measuring pulse on the pulse summing circuits. Thus, once the discriminator circuits are conditioned to inhibit signals from the pulse summing circuits, the following thickness measuring pulses although being summed as before on the pulse summing circuits are ineffective to cause the triggering of the voltage discriminator circuits in sequence starting with the voltage discriminator circuit of channel 5 as would otherwise occur in the absence of the discriminator inhibitor circuits positioned between the pulse summing circuits and the voltage discriminator circuits. The closing of the contacts 75 energizes the conductor 83 from the power supply 80 via the connecting conductor 77. This creates an energized circuit through the conductor 83, closed contacts 84, conductor 85, closed contacts 87, conductor 90, closed contacts 92, conductor 93, closed contacts 95, conductor 96, closed contacts 98 and conductor network 124. The various contacts and connecting conductors associated with the voltage discriminators acts as a switching circuit energized by the closing of contacts 75. The energizing of the conductor network 124 provides a signal that is impressed on the counter and light unit 123, designated "thick reject," of the bank of counters and indicating lights 61. The counter of the unit 123 operates to record the detection of a can having a bottom that is too thick to be acceptable. Simultaneously the signal light of the unit 123 turns on to visually indicate that such an unacceptable can was detected. The signal is passed on from the counter and light unit 123 to the "thick reject" light of the bank of indicating lights 26 positioned either on or adjacent the press 10 to light it for ready observation by the person operating the press, indicating to him that a can having a bottom wall that is too thick to be acceptable has been detected. Energizing of the conductor network 124 also is effective to deliver a reject signal to the shift register 106. This reject signal remains in the shift register and advances through the shift register in stepwise fashion each time a clock pulse is delivered thereto via the conductor network 105 which occurs once for each turn of the timing shaft 30 and operation of the switch 32 thereby. As will be observed in FIGURE 1, the compressed air nozzle 43 is positioned adjacent the flight conveyor 12 four indexed positions thereof down-stream of the thickness measuring station 56. Therefore, on the fourth rotation of the timing shaft 30 the reject signal will have advanced through the shift register 106 and will operate the air valve pulser 110 via the conductor 107, which in turn is effective to pulse the air valve solenoid via the conductor 111 to momentarily open the air valve 46 and direct a blast of compressed air against the bottom wall 47 of the detected "thick reject" can which has now arrived in an indexed position adjacent the compressed air nozzle 43. The can is blasted into the chute 50 of the reject bin 51. The energizing of the conductor network 124 also results in the delivery of a signal to the integrator 114 that a can has been detected having a bottom wall too thick to be acceptable. The function of the integrator 114 and the remainder of the circuitry to the right thereof will be later explained.

Assuming that a subsequent can being measured at the station 56 has a bottom wall that is thicker than normal, but not thick enough to be rejected, the resulting thickness measuring pulses appearing on the conducting network 103 will be larger than the thickness measuring pulses that penetrated the "thick reject" can. These larger pulses when summed on the pulse summing circuits will, when added to the initial charge of the condenser associated with the pulse summing circuit of discriminator channel 5, create a total charge sufficient to reach the trigger voltage level of the voltage discriminator of discriminator channel 5, resulting in the triggering of this voltage discriminator circuit to effect the closing of the normally open contacts thereof 97 and the opening of the normally closed contacts thereof 98. Because the potentiometer 104 associated with the pulse summing circuit of discriminator channel 4 is adjusted to a position resulting in the initial voltage level on the condenser associated therewith being less than the initial voltage as set on the potentiometer associated with the pulse summing circuit of discriminator channel 5, the total charge on the pulse summing circuit of discriminator channel 4 will not be at a high enough level to trigger the voltage discriminator circuit of discriminator channel 4 and the contacts 94 and 95 thereof will remain respectively open and closed. Since the initial charge on the condensers of the pulse summing circuits of discriminator channels 1 through 3 is still lower, the contacts 84, 86, 87, 91 and 92 will also remain in their normal positions. At the end of the eight pulse count, the contacts 75 associated with the pulse counter 74 will be caused to close as explained before, energizing the conductor 83 to create an energized switching circuit through the closed contacts 84, conductor 85, closed contacts 87, conductor 90, closed contacts 92, conductor 93, closed contacts 95, conductor 96 and the now closed contacts 97, so as to energize conductor network 122. The counter and light unit designated "thick" and indicated by the numeral 121 is energized through the conductor 122 so that the counter portion thereof is advanced one count to record the detection of a can having a bottom wall that is thicker than desired but within the acceptable tolerance range. The light associated with the unit 121 will also light at this time to visually indicate the presence of a thick bottom. The person operating the press will be advised of the detection of a thick bottom container by the lighting of the light designated thick on the bank of indicating lights 26. A signal is also provided by the conductor network 122 to the integrator 114 advising the integrator that a thick bottom container has been detected.

Now if a can having a bottom wall of normal thickness is presented at the measuring station 56, the thickness measuring pulses will be of still greater size; the thinner can wall permitting the passage of a greater amount of X-ray energy therethrough. When these pulses are summed as before on the pulse summing circuits, they will, when added to the initial voltages, first result in the triggering of the voltage discriminator of channel 5 and then the voltage discriminator of channel 4, but will not result in a total charge of sufficient intensity to trigger the voltage discriminator circuit of channel 3. Since, between measuring operations on the cans, the voltage discriminator circuits are reset by the signal from the "one shot" 78 on the conductor network 105 all of the contacts associated with the voltage discriminator circuits will be in their normal positions before the measuring operation commenced. However, since the voltage discriminator circuits of the discriminator channels 4 and 5 were triggered, as just explained, during the measuring operation, the contacts 94 and 95 and 97 and 98 thereof will reverse their positions, that is, contacts 94 will now be closed, contacts 95 will be open, contacts 97 will be closed and contacts 98 will be open. This creates an energized switching circuit through the contacts 75, conductor 83, contacts 84, conductor 85, contacts 87, conductor 90, contacts 92, conductor 93, contacts 94 and conductor 120 connected to the counter and light unit designated "normal" and indicated by the numeral 117. The counter of the unit 117 will index one count to record the detection of a can having a normally thick bottom wall and the light associated therewith will light up to give a visual indication of this occurrence as will the "normal" light on the light bank 26.

The subsequent presence of a container at the measuring station 56 having a bottom wall that is thinner than normal but still of acceptable thickness will result in the sequential triggering of the voltage discriminators of discriminator channels 5, 4 and 3 so as to change the normal positions of the contacts associated therewith. This results, upon the closing of the contacts 75, in the energizing of the conductor network 115 which is associated with the counter and light unit designated "thin" and indicated by the numeral 116. The counter associated with the unit 116 is thus caused to index one count to register the detection of a can having a thinner than normal bottom wall and the light associated therewith to light, as well as the remote light designated "thin" in the light bank 26. The energizing of the conductor network 115 also provides a signal to the integrator 114, advising the integrator of the detection of a can with a thinner than normal bottom wall.

If now a can is positioned at the measuring station 56 having a bottom wall 47 thereof that is too thin to be acceptable, still more X-ray energy will pass through the more easily penetrated wall such that the thickness measuring pulses will be still larger, with the result that when these pulses are summed on the pulse summing circuits as before, they will result in the sequential triggering of the voltage discriminator circuits of discriminator channels 5, 4, 3 and 2; resulting in the normally open contacts thereof closing and the normally closed contacts thereof opening. This results in the energizing of conductor network 112 through the relay contacts 75 the conductor 83 and through contacts 84 and 86. The energizing of the conductor network 112 causes the counter associated with the counter and light unit 113 to index one count to record the detection of a can having a bottom wall that is too thin to be acceptable, and the light associated therewith to light up, as well as the "thin reject" light on the remote light bank 26, to visually indicate the detection of such a can to the press operator. A signal is also furnished by the conductor network 112 to the shift register to indicate the detection of a can that is to be subsequently rejected in the same manner as previously explained in connection with the description of the rejection of the can having a bottom wall too thick to be acceptable. A signal is also delivered to the integrator 114 via the network 112 to impress thereon the fact that such a can was detected.

Should no can be present at the measuring station 56 the X-ray energy passes through the air gap with very small diminishing of size. The sum total of the voltages impressed on the summing circuits will, in such case, be so great as to cause the triggering of all of the voltage discriminator circuits with the consequent opening of the contacts 84 which prevents the energization of switching circuitry therebeyond. The empty space on the flight conveyor 12 therefore passes unheralded through the measuring station 56.

Between the measuring operations just described it is necessary to recondition the circuitry to a starting position. The measuring operations take place during the time the switch 32 is in a closed position. After a measuring operation has been accomplished, the switch 32 will be opened by the cam 31. The opening of the switch 32 de-energized the conductor network 101 which acts as a close command signal to the signal gate 66 closing this gate to the passage of thickness measuring pulses therethrough. It also acts as a close command signal to the gate 72 causing this gate to be closed so as to prevent the passage of measurement interval timing pulses therethrough onto the conductor 73 connected to the pulse counter 74. The termination of the energization of the conductor network 101 also results in resetting of the "one shot" circuit 78. The opening of the switch 32 and consequent de-energizing of the conductor network 101 also acts as an erase signal to erase the voltages summed on the pulse summing circuits during the prior measuring operation so that the charges appearing on the condensers therein will once again be the initial charges as set on the respective potentiometers 104 associated therewith. This conditions the pulse summing circuits to the desired initial charge level for the subsequent measuring operation to follow.

On the indexing of the next can on the conveyor 12 into position at the measuring station 56, the switch 32 shortly thereafter is caused to be closed by the cam 31 to re-energize the conductor network 101, and, as explained before, the first measurement interval timing pulse appearing on the conductor 67 after the closing of the switch 32 results in the delivery of a signal pulse from the "one shot" circuit 78 in cooperation with the "AND" circuit 70 onto the conductor network 105 resulting in the delivery of a clock pulse to the shift register 106 to shift any reject signal therein to the next station thereof. The signal on the network 105 also resets the voltage discriminator circuits of channels 1 through 5 to return all of the switching circuit contacts associated therewith to their starting positions; acts as an "erase end" delivered to the pulse summing circuits to enable the pulse summing circuits to sum up the thickness measuring pulses immediately thereafter delivered thereto; opens gate 66 and 72 and resets the pulse counter 74. The resetting of the pulse counter 74 causes the contacts 75 associated therewith, which were closed during the measuring operation, to now return to their normally open position. This occurs slightly in advance of the resetting of the switching circuit contacts back to their normal positions and results in the turning off of the indicator lights. The resetting of the pulse counter also causes the silicon controlled rectifier 76 which was operated to an on state during the measuring operation to be returned to its normally off state. The turning off of the silicon controlled rectifier 76 acts to remove the inhibit signal to the discriminator inhibitor circuits of discriminator inhibitor channels 1 through 5 so that the inhibitor circuits will now pass on charges being summed in the pulse summing circuits to the voltage discriminator circuits during the next measuring operation.

With reference to FIGURE 1; as manufacturing commences, the machine operator watches the light bank to see which light or lights are flashing most frequently. If he notices that the normal light keeps flashing, this advises him that the impact extrusion press 10 is properly adjusted. However, if the thin or thick or the reject lights keep flashing this indicates to the operator that the die cavity of the press needs to be axially repositioned with respect to the press punch in order to produce rough cans having bottom wall thicknesses more nearly centered within the acceptance tolerance range. If the press is equipped with the automatic control system of the invention, which automatically operates the servo motor 17 to turn the press adjusting screw 15 in the desired direction, it will only be necessary for the operator to continue to observe the flashing of the lights of the light bank 26 to ascertain whether or not the automatic control system is operating properly to bring the cans produced into the center of the tolerance range.

When the automatic control means of the invention is not employed, it will be necessary for the operator to manually perform the adjustment to the press adjusting screw 15 by means of the manual press adjusting handle 16. When the flashing lights indicate that the bottom of the cans being produced is too thick, the manual press adjusting handle is turned in a direction to decrease the clearance space between the punch and die; and, when the lights indicate that the bottom of the cans is too thin, the manual press adjusting handle is turned in the opposite direction to increase the clearance space between the end of the ram and the bottom of the die.

The operation of the automatic control in accordance with the invention will now be explained, it being understood that the automatic control system is an optional refinement. The integrator 114 is the signal input to the control system and receives signals as explained before via the conductor networks 112, 115, 122 and 124. The integrator includes a condenser (not shown) on which is impressed a signal pulse of one polarity whenever a signal is received through the conductor network 112 or 115. The condenser of the integrator 114 receives a signal pulse of an opposite polarity whenever a signal is delivered thereto on the conductor network 122 or 124. The magnitude of the signal pulses impressed on the condenser can be equal, or the integrator can be set up so that the signals delivered on the conductor networks 112 and 124, corresponding to "thin reject" and "thick reject" cans respectively, are of greater magnitude than the pulses delivered to the condenser as a result of signals being received on the conductor networks 115 and 122 corresponding to "thin" and "thick" respectively detected cans. As long as cans are encountered having a bottom wall of normal thickness, no signal is received by the integrator 114 and the servo motor 17 will not be activated to readjust the press adjusting screw 15. However, if a trend appears such that a substantial number of thin and thin reject cans are being produced, this will cause repetitious voltage pulses of one polarity being impressed upon the condenser of the integrator 114, until the total charge on the condenser reaches a sufficient level, that when amplified in the amplifier 126, will trigger the discriminator circuit 131 due to the trigger level thereof as set on potentiometer 133 having been reached. The discriminator 131 is sensitive to the polarity of the pulses being impressed on the condenser of the integrator 114 as a result of a preponderance of thin and thin reject signals being delivered to the integrator 114. On the other hand, the discriminator 130 is sensitive to opposite polarity pulses building up on the condenser of the integrator 114 as a result of a preponderance of thick and thick reject signals being delivered to the integrator 114. The triggering of the discriminator circuit 131 causes the application of a signal on the "AND" circuit 135 therefrom. The "AND" circuit 135 is associated with the preset counter 102 which is operated by signals from the conductor network 101 each time the switch 32 closes; consequently for each operation of the press 10 in manufacturing a rough can 11. Each time the preset counter is operated through the conductor network 101 it counts off one number. If it is set for, as an example, 40 counts, it will take 40 operations of the press before the preset counter will deliver a signal to the flip-flop 155. When the flip-flop receives a signal from the preset counter 102, it passes the signal therethrough and the signal is simultaneously impressed on the "AND" circuit 135 with the signal through the discriminator 131 resulting in the "AND" circuit 135 passing a signal through the flip-flop 137 to the switch 141 causing the switch to close. The switch 142, when closed, results in the operation of the servo motor 17 in a reverse direction to back off the press adjusting screw, causing the die clearance of the press to be increased with a consequent increase in the thickness of the bottom of the cans being manufactured. The speed control 142 between the switch 141 and servo motor 17 functions to cause the servo motor to run at a desired preset speed as adjusted on the control 143 regardless of variations in the load torque being applied to the servo motor 17. Speed feedback information from the servo motor 17 is fed back to the speed control unit 142 via the conductor 146. It is desired that the output shaft 21 of the servo motor 17, which is geared down and rotates relatively slowly, will only rotate a predetermined amount each actuation thereof. This is accomplished through the preset counter 151 and the photo electric sensor 20. The shaft 21 has marks around its circumference, as previously explained, which may be spaced one degree apart and which are detectable by the photoelectric sensor 20. The preset counter 151 can be set to count off a predetermined number of the marks on the shaft 21 as they move past the lens 150 of the photoelectric sensor. For example, the preset counter may be adjusted to count off 40 such marks which represent 40° of angular rotation of the shaft. When the shaft 21 has rotated through the 40°, the preset counter then delivers a signal to the amplifier 153 which amplifies and delivers the signal onto the conductor network 154. This signal is effective to reset the flip-flop 137 which terminates the signal to the switch 141 causing the switch to open. The opening of the switch 141 immediately causes the servo motor 17 to turn off. The signal appearing on the conductor network 154 also resets the preset counters 102 and 151 and changes the state of the flip-flop 155, terminating the signal appearing on the conductor network 156 to the "AND" circuit 135.

Conversely if the discriminator circuit 130 is triggered, a signal therefrom is applied to the "AND" 134. When the preset number of pulses has been delivered to the preset counter 102 by the conductor network 101 after the last operation of the servo motor 17, a signal will appear on the conductor network 156, which, when impressed on the "AND" 134 simultaneously with the signal from the discriminator circuit 130, results in a signal therefrom being delivered through the flip-flop 136 to the switch 140 causing it to close. This energizes the servo motor 17 through the speed control unit 142 to run in a forward direction. This causes the turning of the press adjusting screw 15 in a reverse direction to decrease the clearance space between the end of the punch and the bottom of the die cavity resulting in the production of cans having a thinner bottom wall.

The preset counters are employed so as to limit the amount of adjustment to the shaft made during each operation of the servo motor to a preselected amount as set on the preset counter 151 and to limit the number of such adjustments made to one for a definite number of machine cycles as set on the preset counter 102.

The time constant adjustment 125 on the integrator 114 allows any charge built up on the condenser therein to decay over a desired set time interval. For example, if there is a preponderance of pulses of one polarity impressed on the condenser during operations but not of a high enough level to trigger either of the discriminators 130 or 131 and then the machine runs steady for a long period of time producing cans having bottoms of normal thickness such that no further charges are impressed on the condenser, it is desirable for the charge thereon to decay down to zero so that the integrator will not be prejudiced in favor of pulses of either polarity later impressed thereon.

Although a preferred form of the invention has been described and illustrated it will be apparent that modifications thereto with the spirit and scope of the invention can be made. For example, the conveyor 12 could be run at a steady constant speed instead of intermittently. In such case the bottom of the cans would be scanned by the X-ray beams as the cans moved therepast and the switch 32 would close and open as before, once during the passage of each can through the measuring station 56. The invention also need not necessarily be employed in conjunction with a particular article manufacturing machine and may be used to gauge, classify and reject articles on any suitable conveyor system. It is therefore not the intention to limit the scope of the invention to the particular details illustrated in the drawings but rather only as set forth in the accompanying claims.

We claim:

1. Article thickness gauging and classifying apparatus associated with a conveyor for conveying discrete articles along a path in single file order, comprising: means for delivering an X-ray beam in the form of discrete X-ray pulses across said path; detector means for receiving the X-ray pulses and converting the pulses into electrical thickness measuring pulses; means for generating electrical timing pulses at the same frequency rate as the thickness measuring pulses; discriminator channels for receiving the thickness measuring pulses; means for counting the timing pulses and indirectly the thickness measuring pulses; cooperating timing and gating means effective at times when an article is expected to be present in the X-ray beam to gate the timing pulses to the counting means and the thickness measuring pulses to the discriminator channels; means operated by the counting means upon the counting of a definite number of the timing pulses thereby, to inhibit the discriminator channels upon delivery thereto of a predetermined number of the thickness measuring pulses, and thickness classification indicating means associated with the discriminator channels for indicating the thickness classification of articles determined by the discriminator channels.

2. Apparatus as set forth in claim 1 further characterized in that electrically operated means for removing articles from the conveyor determined to be out of an acceptable tolerance range by the discriminator channels is provided, said removing means being electrically associated with the discriminator channels for receiving reject signals therefrom.

3. Article thickness gauging and classifiying apparatus associated with a conveyor for conveying discrete articles along a path in single file order comprising: an X-ray tube positioned adjacent the conveyor on one side of the path for generating an X-ray beam in the form of discrete X-ray pulses directed across the path of the discrete articles; an X-ray detector positioned on the opposite side of the path for receiving X-ray pulses from the X-ray tube; pulse generating means for generating discrete constant amplitude and frequency electrical pulses and delivering the pulses to the X-ray tube, said X-ray tube converting the electrical pulses into a beam of substantially constant size discrete X-ray pulses, and said X-ray detector converting the X-ray pulses to electrical thickness measuring pulses substantially in phase with the electrical pulses to the X-ray tube and of a size depending upon whether or not an article to be gauged is present in the X-ray beam and the thickness of the article dimension being gauged; a first gate for permitting or preventing the passage of the thickness measuring pulses; a plurality of thickness classification discriminator channels, each being set at a different trigger level, for receiving thickness measuring pulses through said first gate; a switching circuit associated with the discriminator channels having an initial setting and being resettable to successive new settings by successive triggering of the discriminator channels; article thickness classification indicating means associated with the discriminator channels and selectively operated through the switching circuit when the switching circuit is energized; an "AND" circuit for receiving electrical measurement interval timing pulses from the said pulse generating means; timing means operating in synchronism with the conveyor to deliver a signal to the "AND" when an article is expected to be present in the X-ray beam, said "AND" being effective to pass measurement interval timing pulses only upon receiving a signal from the timing means and from the first measurement interval timing pulse following thereafter; a "one shot" for receiving the timing pulses from the "AND" and being effective to provide a single signal pulse upon receiving the first timing pulse from the "AND"; said single signal pulse being effective to open said first gate to deliver thickness measuring pulses therethrough to the discriminator channels; a second gate also opened by the said single pulse to substantially simultaneously pass a series of the measurement interval timing pulses therethrough; a pulse counter for counting a predetermined number of the measurement interval timing pulses passed through the second gate; a discriminator inhibitor associated with each discriminator channel and operated by the counter upon the completion of the counting of the predetermined number of measurement interval timing pulses to render the discriminator channels insensitive to the delivery of further thickness measuring pulses thereto; switch means associated with the counter for operation thereby to energize the switching circuit after the counter has completed the counting of the predetermined number of pulses, the energizing of the switching circuit being effective to operate the appropriate one of the article thickness classification indicating means associated with the discriminator channels in response to the maintenance of the initial setting of the switching circuit or in response to a reset condition thereof effected by the triggering of at least one of the discriminator channels as determined by the charge level impressed on the discriminator channels by the definite number of thickness measuring pulses considered thereby, corresponding to the number of measurement interval timing pulses counted off by the counter, the charge level being in inverse proportion to the thickness dimension of the article being gauged.

4. Apparatus as set forth in claim 3 further characterized in that electrically operated means for removing articles from the conveyor determined to be out of an acceptable tolerance range is provided; said removing means being electrically connected to the switching circuit for receiving reject signals therethrough.

5. Apparatus for thickness gauging and classifying discrete articles being produced in a production machine and for regulating the production machine to produce articles having a thickness dimension centered within a tolerance range comprising: means for conveying articles from the production machine along a predetermined path; means for delivering an X-ray beam in the form of discrete X-ray pulses across said path; detector means for receiving the X-ray pulses and converting the pulses into electrical thickness measuring pulses; means for generating electrical timing pulses at the same frequency rate as the thickness measuring pulses; discriminator channels for receiving the thickness measuring pulses; means for counting the timing pulses and indirectly the thickness measuring pulses; cooperating timing and gating means effective at times when an article is expected to be present in the X-ray beam to gate the timing pulses to the counting means and the thickness measuring pulses to the discriminator channels; means operated by the counting means upon the counting of a definite number of the timing pulses thereby to inhibit the discriminator channels upon delivery thereto of a predetermined number of the thickness measuring pulses, and control means associated with the discriminator channels effective to periodically correctively regulate the production machine in response to repetitious signals from the discriminator channels indicating that the being controlled thickness dimension of a preponderance of the articles being produced is varying in one direction from a predetermined optimum thickness.

6. Apparatus as set forth in claim 5 further characterized in that thickness classification indicating means associated with the discriminator channels is provided for indicating the thickness classification of articles determined by the discriminator channels.

7. Apparatus as set forth in claim 6 further characterized in that electrically operated means for removing articles from the conveying means determined to be out of an acceptable tolerance range by the discriminator channels is provided; said removing means being electrically associated with the discriminator channels for receiving reject signals therefrom.

8. Apparatus for thickness gauging and classifying discrete articles being produced in a production machine and for regulating the production machine to produce articles having a thickness dimension centered within a tolerance range comprising: means for conveying articles from the production machine along a predetermined path; an X-ray tube positioned adjacent the conveying means on one side of the path for generating an X-ray beam in the form of discrete X-ray pulses directed across the path of the discrete articles; an X-ray detector positioned on the opposite side of the path for receiving X-ray pulses from the X-ray tube; pulse generating means for generating discrete constant amplitude and frequency electrical pulses and delivering the pulses to the X-ray tube, said X-ray tube converting the electrical pulses into a beam of substantially constant size discrete X-ray pulses, and said X-ray detector converting the X-ray pulses to electrical thickness measuring pulses substantially in phase with the electrical pulses to the X-ray tube and of a size depending upon whether or not an article to be gauged is present in the X-ray beam and the thickness of the article dimension being gauged; a first gate for permitting or preventing the passage of the thickness measuring pulses; a plurality of thickness classification discriminator channels, each being set at a different trigger level for receiving thickness measuring pulses through said first gate; a switching circuit associated with the discriminator channels having an initial setting and being resettable to successive new settings by successive triggering of the discriminator channels; and "AND" circuit for receiving electrical measurement interval timing pulses from the said pulse generating means; timing means operating in synchronism with the conveying means to deliver a signal to the "AND" when an article is expected to be present in the X-ray beam, said "AND" being effective to pass measurement interval timing pulses only upon receiving a signal from the timing means and from the first measurement interval timing pulse following thereafter; a "one shot" for receiving the timing pulses from the "AND" and being effective to provide a single signal pulse open receiving the first timing pulse from the "AND"; said single signal pulse being effective to open said first gate to deliver thickness measuring pulses therethrough to the discriminator channels; a second gate opened by the said single signal pulse to substantially simultaneously pass a series of the measurement interval timing pulses therethrough; a pulse counter for counting a predetermined number of the measurement interval timing pulses passed through the second gate; a discriminator inhibitor associated with each discriminator channel and operated by the counter upon the completion of the counting of the predetermined number of measurement interval timing pulses to render the discriminator channels insensitive to the delivery of further thickness measuring pulses thereto; switch means associated with the counter for operation thereby to energize the switching circuit after the counter has completed the counting of the predetermined number of pulses; and control means associated with the switching circuit for operation through the switching circuit when it is energized and being effective to periodically correctively regulate the production machine in response to repetitious settings of the switching circuit indicating that the being controlled thickness dimension of a preponderance of the articles being produced is varying in one direction from a predetermined optimum thickness.

9. Apparatus as set forth in claim 8 further characterized in that electrically operated means for removing articles from the conveyor determined to be out of the tolerance range is provided; said removing means being electrically connected to the switching circuit for receiving reject signals therethrough.

10. Apparatus as set forth in claim 9 further characterized in that thickness classification indicating means operated through the switching circuit are provided for indicating the thickness classification of articles determined by the discriminator channels.

11. Article thickness gauging and classifying apparatus associated with a conveyor for conveying discrete articles along a path comprising; means for delivering an X-ray beam in the form of discrete X-ray pulses across said path; detector means for receiving X-ray pulses and converting the X-ray pulses into electrical thickness measuring pulses; means for generating electrical timing pulses; discriminator channels for receiving thickness measuring pulses; means for counting timing pulses; cooperating timing and gating means effective at times when an article is expected to be present in the X-ray beam to gate timing pulses to the counting means and thickness measuring pulses to the discriminator channels; inhibiting means associated with the discriminator channels and being conditioned by the counting means upon the counting of a definite number of timing pulses to inhibit the discriminator channels; and thickness classification indicating means associated with the discriminator channels for indicating the thickness classification of articles.

12. Apparatus as set forth in claim 11 further characterized in that electrically operated means for removing articles from the conveyor determined to be out of an acceptable tolerance range by the discriminator channels is provided, said removing means being electrically associated with the discriminator channels for receiving reject signals therefrom.

13. Apparatus for thickness gauging and classifying discrete articles being produced in a production machine for regulating the production machine to produce articles having a thickness dimension centered within a tolerance range comprising: means for delivering articles from the production machine along a predetermined path; means for delivering an X-ray beam in the form of discrete X-ray pulses across said path; detector means for receiving X-ray pulses and converting the pulses into electrical thickness measuring pulses; means for generating electrical timing pulses; discriminator channels for receiving thickness measuring pulses; means for counting timing pulses; cooperating timing and gating means effective at times when an article is expected to be present in the X-ray beam to gate timing pulses to the counting means and thickness measuring pulses to the discriminator channels; inhibiting means associated with the discriminator channels and being conditioned by the counting means upon the counting of a definite number of the timing pulses to inhibit the discriminator channels upon delivery thereto of a predetermined number of thickness measuring pulses; and control means associated with the discriminator channels effective to periodically correctively regulate the production machine in response to signals from the discriminator channels indicating that the thickness dimension of the articles that is being controlled is varying in one direction from a predetermined optimum thickness.

14. Apparatus as set forth in claim 13 further characterized in that thickness classification indicating means associated with the discriminator channels is provided for indicating the thickness classification of articles, determined by the discriminator channels.

15. Apparatus as set forth in claim 14 further characterized in that electrically operated means for removing articles from the article delivering means determined to be out of an acceptable tolerance range by the discriminator channels is provided; said removing means being electrically associated with the discriminator channels for receiving reject signals therefrom.

References Cited

UNITED STATES PATENTS 2,653,247  9/1953  Lundahl _____ 250—83.3
2,890,347  6/1959  McCormick.

M. HENSON WOOD, JR., *Primary Examiner.*

R. A. SCHACHER, *Assistant Examiner.*